United States Patent
Li

(10) Patent No.: US 11,573,650 B2
(45) Date of Patent: Feb. 7, 2023

(54) MAGNETIC ROLLER DAMPING DEVICE AND IMPLEMENTING METHOD THEREOF

(71) Applicant: Hanvon Ugee Technology Co., Ltd., Guangdong (CN)

(72) Inventor: Yuanzhi Li, Guangdong (CN)

( * ) Notice: Subject to any disclaimer, the term of this patent is extended or adjusted under 35 U.S.C. 154(b) by 182 days.

(21) Appl. No.: 16/964,246

(22) PCT Filed: Mar. 9, 2018

(86) PCT No.: PCT/CN2018/078594
§ 371 (c)(1),
(2) Date: Jul. 23, 2020

(87) PCT Pub. No.: WO2019/144474
PCT Pub. Date: Aug. 1, 2019

(65) Prior Publication Data
US 2021/0041962 A1   Feb. 11, 2021

(30) Foreign Application Priority Data

Jan. 23, 2018  (CN) .......................... 201810062073.1

(51) Int. Cl.
*G06F 3/0362* (2013.01)
*G06F 3/038* (2013.01)
(52) U.S. Cl.
CPC .......... *G06F 3/0362* (2013.01); *G06F 3/0383* (2013.01)
(58) Field of Classification Search
CPC ...... G06F 3/0362; G06F 3/0383; G06F 3/033; G06F 3/038; G01P 3/487; G01P 13/045; G01D 5/145
See application file for complete search history.

(56) References Cited

U.S. PATENT DOCUMENTS

| 2006/0108999 | A1 | 5/2006 | Lee et al. |
| 2007/0188453 | A1* | 8/2007 | O'Sullivan ......... G06F 3/03543 345/163 |
| 2016/0176292 | A1* | 6/2016 | Blaesing ............... G06F 3/0412 335/219 |

(Continued)

FOREIGN PATENT DOCUMENTS

| CN | 201535896 U | 7/2010 |
| CN | 105302344 A | 2/2016 |

(Continued)

OTHER PUBLICATIONS

International Search Report (PCT/CN 2018/078594); dated Oct. 11, 2018; 10 pgs. Notification of the Recording of a Change (PCT/CN 2018/078594); dated Jun. 17, 2020; 2 pgs.

*Primary Examiner* — Temesghen Ghebretinsae
*Assistant Examiner* — Karin Kiyabu
(74) *Attorney, Agent, or Firm* — Warshaw Burstein, LLP

(57) ABSTRACT

Disclosed are a magnetic roller damping device and an implementing method thereof. The device includes a magnetic roller and a magnetic damping mechanism. The magnetic roller includes a first multipole magnet that includes at least one pair of magnetic poles with opposite polarities. The magnetic damping mechanism uses a magnetic damping magnet or metal attractable to the first multipole magnet, the magnetic damping magnet or metal is positioned in a magnetic field of the first multipole magnet, and a distance between the magnetic damping magnet or metal and the magnetic roller is adjustable.

7 Claims, 7 Drawing Sheets

(56) References Cited

U.S. PATENT DOCUMENTS

| | | |
|---|---|---|
| 2017/0262083 A1 | 9/2017 | Huang et al. |
| 2018/0164901 A1* | 6/2018 | O'Mahony ............ G06F 3/0213 |
| 2019/0121452 A1* | 4/2019 | Hsueh ................. G06F 3/03543 |
| 2020/0174512 A1* | 6/2020 | Battlogg .................. G05G 5/03 |

FOREIGN PATENT DOCUMENTS

| | | |
|---|---|---|
| CN | 106339112 A | 1/2017 |
| EP | 3051390 A1 | 8/2016 |
| JP | 2003148998 A | 5/2003 |
| JP | 2003280799 A | 10/2003 |
| JP | 2005513653 A | 5/2005 |
| JP | 2006260179 A | 9/2006 |
| JP | 2007026026 A | 2/2007 |
| TW | I587343 B | 6/2017 |
| WO | 03/054782 A1 | 7/2003 |
| WO | WO-2018102227 A1 * | 6/2018 ............. G06F 3/016 |

\* cited by examiner

MAGNETIC ROLLER DAMPING DEVICE AND IMPLEMENTING METHOD THEREOF

CROSS-REFERENCE TO RELATED APPLICATIONS

This application is a national stage filing under 35 U.S.C. § 371 of international application number PCT/CN2018/078594, filed Mar. 9, 2018, which claims priority to Chinese patent application No. 201810062073.1 filed Jan. 23, 2018. The contents of these applications are incorporated herein by reference in their entirety.

TECHNICAL FIELD

The disclosure relates to the field of handwriting devices, and in particular, to a magnetic roller damping device and an implementing method thereof.

BACKGROUND

Rollers are widely used in the market of handwriting tablets. The rollers are generally used for continuous data adjustment, which are very convenient and intuitive to use. However, each user has different requirements on roller smoothness (i.e., resistance). At present, a roller commonly used in a handwriting device is a mechanical roller which is driven to rotate through frictional resistance. To meet different requirements on roller smoothness, existing mechanical roller needs to use different materials, which is inflexible and not highly universal. In addition, the mechanical roller may suffer from frictional loss due to the existence of the frictional resistance, reducing the service life of the roller.

SUMMARY

To solve the above technical problems, the disclosure aims at providing a magnetic roller damping device, which is flexible and highly universal and has a long service life, and an implementing method thereof.

The first technical solution adopted in the disclosure is as follows.

There is provided a magnetic roller damping device, including: a magnetic roller and a magnetic damping mechanism, wherein the magnetic roller includes a first multipole magnet that includes at least one pair of magnetic poles with opposite polarities, the magnetic damping mechanism uses a magnetic damping magnet or metal attractable to the first multipole magnet, the magnetic damping magnet or metal is positioned in a magnetic field of the first multipole magnet, and a distance between the magnetic damping magnet or metal and the magnetic roller is adjustable.

Further, the magnetic damping magnet is a second multipole magnet that includes at least one pair of magnetic poles with opposite polarities.

Further, the magnetic damping magnet is fixed without rotation or rotates with the rotation of the magnetic roller.

Further, when the magnetic damping magnet is fixed without rotation, the number of divisions of scale senses corresponding to one rotation of the magnetic roller is equal to half of the total number of magnetic poles of the first multipole magnet, and one division of scale sense represents a whole process in which a force between the first multipole magnet and the magnetic damping magnet changes from an attractive force to a repulsive force and then from the repulsive force to the attractive force.

Further, when the magnetic damping magnet rotates with the rotation of the magnetic roller, the number of divisions of scale senses corresponding to one rotation of the magnetic roller is equal to the total number of magnetic poles of the first multipole magnet, and one division of scale sense represents a whole process in which a force between the first multipole magnet and the magnetic damping magnet changes from an attractive force to a repulsive force and then from the repulsive force to the attractive force.

Further, the magnetic roller damping device further includes an MCU and multiple Hall components, wherein the multiple Hall components are positioned in the magnetic field of the first multipole magnet, and output ends of the multiple Hall components are all connected to an input end of the MCU.

The second technical scheme adopted in the disclosure is as follows.

There is provided a method for implementing a magnetic roller damping device, including the following steps:

acquiring a distance between a magnetic damping mechanism and a magnetic roller in real time, wherein the magnetic roller includes a first multipole magnet that includes at least one pair of magnetic poles with opposite polarities, the magnetic damping mechanism uses a magnetic damping magnet or metal attractable to the first multipole magnet, the magnetic damping magnet or metal is positioned in a magnetic field of the first multipole magnet, and a distance between the magnetic damping magnet or metal and the magnetic roller is adjustable; and determining a magnitude of a magnetic resistance between the magnetic damping mechanism and the magnetic roller according to the distance acquired in real time.

Further, the method further includes:

judging whether the magnetic damping mechanism is a magnetic damping magnet, if yes, proceeding to a next step, and otherwise, ending the method;

acquiring a rotation state of the magnetic damping magnet in real time, the rotation state of the magnetic damping magnet including a state of being fixed without rotation and a state of rotating with the rotation of the magnetic roller; and calculating the number of divisions of scale senses corresponding to one rotation of the magnetic roller according to the rotation state acquired in real time, one division of scale sense representing a whole process in which a force between the first multipole magnet and the magnetic damping magnet changes from an attractive force to a repulsive force and then from the repulsive force to the attractive force.

Further, the calculating the number of divisions of scale senses corresponding to one rotation of the magnetic roller according to the rotation state acquired in real time includes:

if the rotation state acquired in real time is the state of being fixed without rotation, calculating the number of divisions of scale senses corresponding to one rotation of the magnetic roller according to the total number of magnetic poles of the first multipole magnet, the number of divisions of scale senses corresponding to one rotation of the magnetic roller being equal to the total number of magnetic poles of the first multipole magnet divided by 2; and if the rotation state acquired in real time is the state of rotating with the rotation of the magnetic roller, calculating the number of divisions of scale senses corresponding to one rotation of the magnetic roller according to the total number of magnetic poles of the first multipole magnet, the number of divisions of scale senses corresponding to one rotation of the magnetic roller being equal to the total number of magnetic poles of the first multipole magnet.

Further, the method further includes acquiring rotation information of the magnetic roller through multiple Hall components and an MCU.

The disclosure has the following beneficial effects: according to the magnetic roller damping device and the implementing method thereof in the disclosure, the magnetic roller damping device composed of the magnetic roller and the magnetic damping mechanism replaces a conventional mechanical roller, and magnetic resistances of different magnitudes can be provided according to the magnetic field force principle just by adjusting a distance between the magnetic roller and the magnetic damping magnet or metal, so that different requirements on roller smoothness are met without using different materials. The magnetic roller damping device is flexible and highly universal. The magnetic field force has no frictional loss, and the service life of the roller is prolonged. Further, the magnetic damping magnet is a second multipole magnet, and can provide users with a sense of scale through a whole process in which a force restores from a repulsive force to an attractive force when the magnetic damping magnet is fixed without rotation or rotates with the rotation of the magnetic roller, which has richer functions.

DETAILED DESCRIPTION

Figure 1:
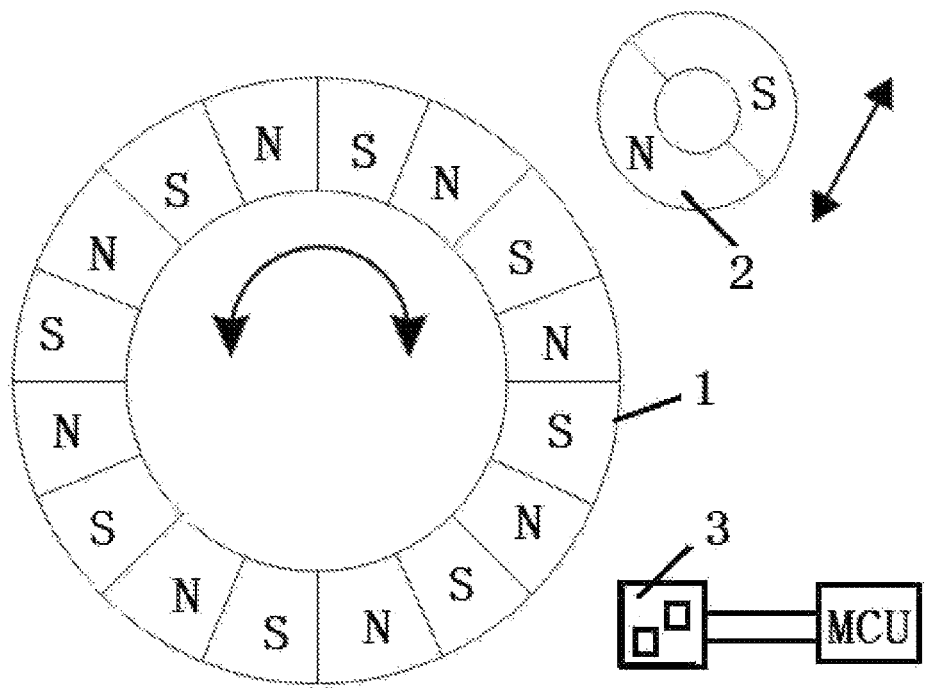
FIG. 1 is a schematic structural diagram of a magnetic roller damping device when a magnetic damping mechanism is a magnetic damping magnet according to the disclosure.
Figure 2:
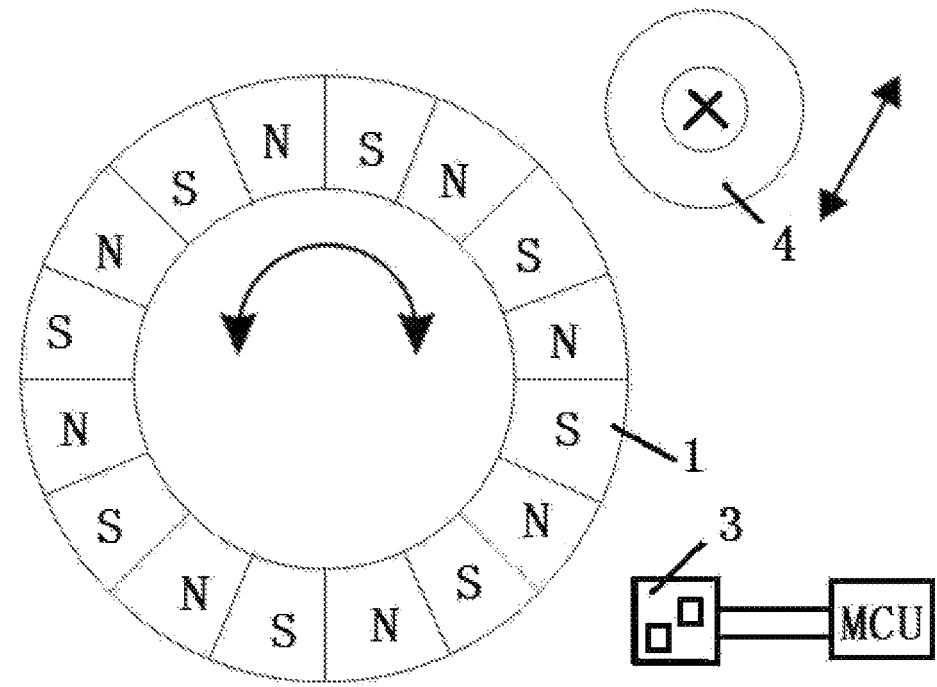
FIG. 2 is a schematic structural diagram of the magnetic roller damping device when the magnetic damping mechanism is metal according to the disclosure.

Referring to FIG. 1 and FIG. 2, a magnetic roller damping device is provided including a magnetic roller and a magnetic damping mechanism. The magnetic roller includes a first multipole magnet 1 that includes at least one pair of magnetic poles with opposite polarities. The magnetic damping mechanism uses a magnetic damping magnet 2 or metal 4 attractable to the first multipole magnet 1. The magnetic damping magnet 2 or metal 4 is positioned in a magnetic field of the first multipole magnet 1, and a distance between the magnetic damping magnet or metal and the magnetic roller is adjustable.

The magnetic damping mechanism, which is a magnetic damping magnet in FIG. 1 and is a metal in FIG. 2, can interact with the first multipole magnet to produce an attractive force, and there is no limitation on the shape and material of the magnetic damping magnet or metal.

As a further preferred implementation, the magnetic damping magnet is a second multipole magnet that includes at least one pair of magnetic poles with opposite polarities.

Figure 3:
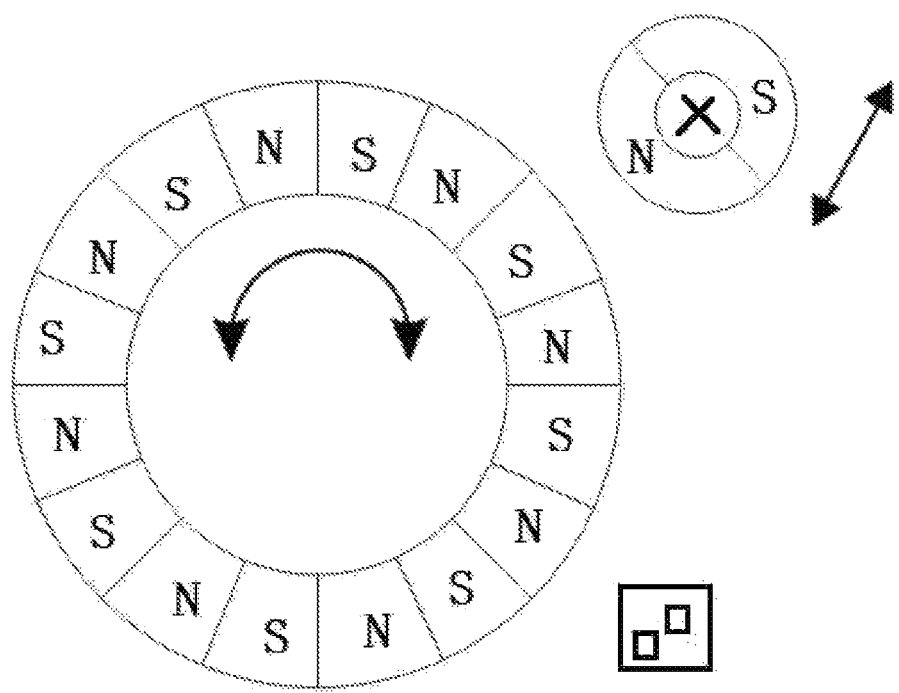
FIG. 3 is a schematic structural diagram when the magnetic damping magnet is fixed without rotation according to the disclosure.
Figure 4:
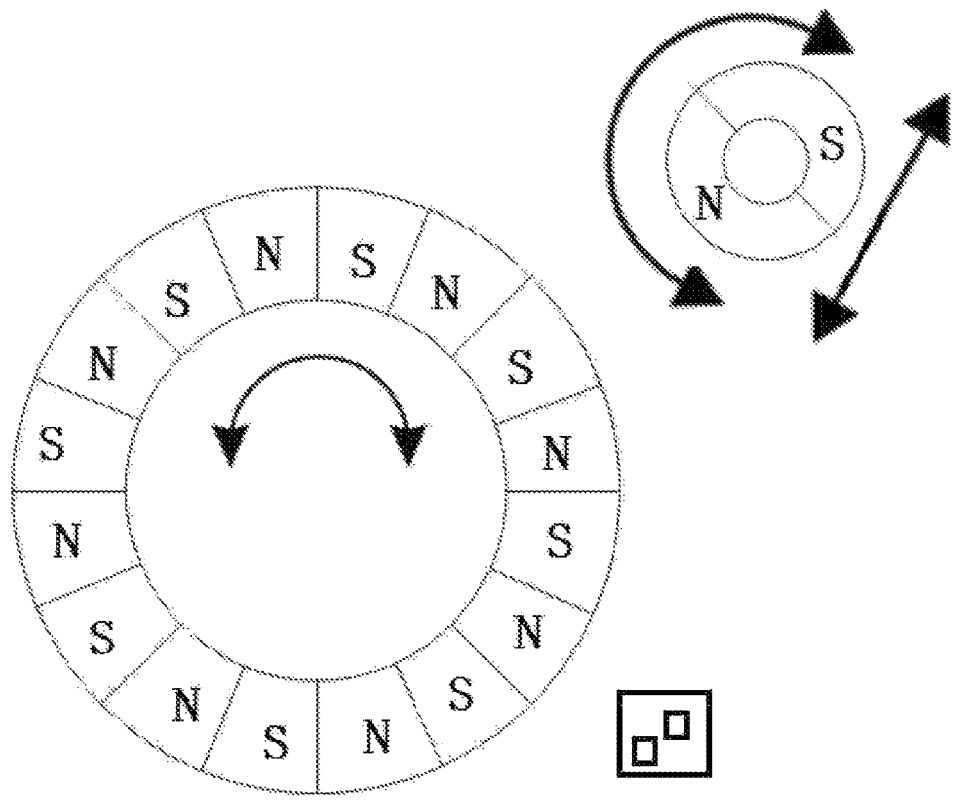
FIG. 4 is a schematic structural diagram when the magnetic damping magnet rotates with the rotation of the magnetic roller according to the disclosure.

Referring to FIG. 3 and FIG. 4, as a further preferred implementation, the magnetic damping magnet is fixed without rotation or rotates with the rotation of the magnetic roller.

The magnetic damping magnet in FIG. 3 is fixed without rotation, while the magnetic damping magnet in FIG. 4 rotates with the rotation of the magnetic roller.

As a further preferred implementation, when the magnetic damping magnet is fixed without rotation, the number of divisions of scale senses corresponding to one rotation of the magnetic roller is equal to half of the total number of magnetic poles of the first multipole magnet, and one division of scale sense represents a whole process in which a force between the first multipole magnet and the magnetic damping magnet changes from an attractive force to a repulsive force and then from the repulsive force to the attractive force.

In this embodiment, one division of scale sense represents a whole process in which a force between the magnetic damping magnet and the first multipole magnet changes from attraction to repulsion and then to attraction during rotation of the first multipole magnet. Since multiple above complete processes may occur during one rotation of the magnetic roller, that is, during one rotation of the first multipole magnet, there may also be multiple divisions of scale senses. In this embodiment, since the magnetic damping magnet is fixed, the first multipole magnet of the magnetic roller may jump two magnetic poles at a time during rotation. In this process, the first multipole magnet may pass through a magnetic pole in the magnetic damping magnet which is of the same polarity as the magnetic pole on the magnetic roller, so there may be a repulsive force between the magnetic poles, and eventually the magnetic roller may maintain a state in which the magnetic roller and the magnetic damping magnet attract each other due to opposite polarities. The process of changing from the repulsive force to an attractive force due to opposite polarities during rotation of the magnetic roller is like a scale sense. The scale sense is similar to a mechanical jamming of the mechanical roller. After rotation, a jamming occurs due to the repulsive force for mutual repulsion of the same polarities. Each time the magnetic roller rotates, each jamming is just like a division of scale to limit the angle of each rotation.

As a further preferred implementation, when the magnetic damping magnet rotates with the rotation of the magnetic roller, the number of divisions of scale senses corresponding to one rotation of the magnetic roller is equal to the total number of magnetic poles of the first multipole magnet, and one division of scale sense represents a whole process in which a force between the first multipole magnet and the magnetic damping magnet changes from an attractive force to a repulsive force and then from the repulsive force to the attractive force.

In this embodiment, one division of scale sense represents a whole process in which a force between the magnetic damping magnet and the first multipole magnet changes from attraction to repulsion and then to attraction during rotation of the magnetic damping magnet and the first multipole magnet. Since multiple above complete processes may occur during one rotation of the magnetic roller, that is, during one rotation of the first multipole magnet, there may also be multiple divisions of scale senses. In this embodiment, since the magnetic damping magnet also rotates, the magnetic damping magnet may initially be driven to rotate due to mutual attraction of opposite polarities of the magnetic damping magnet and the first multipole magnet. When the magnetic damping magnet and the first multipole magnet are both at the boundary of polarity reversal, there may be a brief mutual repulsion for the same polarities, and then the two magnets may move to the next poles and return to the state in which they attract each other due to opposite polarities. The process of changing from the repulsive force to an attractive force due to opposite polarities during rotation of the magnetic roller is like a scale sense. The scale sense is similar to a mechanical jamming of the mechanical roller. After rotation, a jamming occurs due to the repulsive force for mutual repulsion of the same polarities. Each time the magnetic roller rotates, each jamming is just like a division of scale to limit the angle of each rotation.

As a further preferred implementation, an MCU and multiple Hall components are further included, the multiple Hall components are positioned in the magnetic field of the first multipole magnet, and output ends of the multiple Hall components are all connected to an input end of the MCU.

In the disclosure, continuous data reading and writing of a handwriting device may be implemented by using multiple Hall components in conjunction with the MCU and the first multipole magnet on the magnetic roller. During rotation, the roller drives the first multipole magnet to produce a changing magnetic field. The changing magnetic field interacts with the multiple Hall components in fixed positions to produce a Hall effect. The Hall components are arranged at different positions, so Hall voltages (phase, current, etc.) sensed by the Hall components at the same time are all different. The MCU judges and acquires, according to this phenomenon, a difference between signals output by the Hall components, and then judges and calculates rotation information (including a rotational speed, etc.) of the first multipole magnet (i.e., the roller).

The disclosure further provides a method for implementing a magnetic roller damping device, including the following steps:

acquiring a distance between a magnetic damping mechanism and a magnetic roller in real time, wherein the magnetic roller includes a first multipole magnet that includes at least one pair of magnetic poles with opposite polarities, the magnetic damping mechanism uses a magnetic damping magnet or metal attractable to the first multipole magnet, the magnetic damping magnet or metal is positioned in a magnetic field of the first multipole magnet, and a distance between the magnetic damping magnet or metal and the magnetic roller is adjustable; and determining a magnitude of a magnetic resistance between the magnetic damping mechanism and the magnetic roller according to the distance acquired in real time.

According to the related theory of magnetic field, a magnitude of a magnetic resistance between the magnetic damping mechanism and the magnetic roller is inversely proportional to a distance therebetween.

As a further preferred implementation, the method further includes the following steps:

judging whether the magnetic damping mechanism is a magnetic damping magnet, if yes, proceeding to a next step, and otherwise, ending the method;

acquiring a rotation state of the magnetic damping magnet in real time, the rotation state of the magnetic damping magnet including a state of being fixed without rotation and a state of rotating with the rotation of the magnetic roller; and calculating the number of divisions of scale senses corresponding to one rotation of the magnetic roller according to the rotation state acquired in real time, one division of scale sense representing a whole process in which a force between the first multipole magnet and the magnetic damping magnet changes from an attractive force to a repulsive force and then from the repulsive force to the attractive force.

As a further preferred implementation, the step of calculating the number of divisions of scale senses corresponding to one rotation of the magnetic roller according to the rotation state acquired in real time is specifically:

if the rotation state acquired in real time is the state of being fixed without rotation, calculating the number of divisions of scale senses corresponding to one rotation of the magnetic roller according to the total number of magnetic poles of the first multipole magnet, the number of divisions of scale senses corresponding to one rotation of the magnetic roller equals to the total number of magnetic poles of the first multipole magnet divided by 2; and if the rotation state acquired in real time is the state of rotating with the rotation of the magnetic roller, calculating the number of divisions of scale senses corresponding to one rotation of the magnetic roller according to the total number of magnetic poles of the first multipole magnet, the number of divisions of scale senses corresponding to one rotation of the magnetic roller equals to the total number of magnetic poles of the first multipole magnet.

As a further preferred implementation, the method further includes a step of acquiring rotation information of the magnetic roller through multiple Hall components and an MCU.

The disclosure is further explained and described below with reference to the accompanying drawings of and a specific embodiment of the description.

This specific embodiment discloses a magnetic resistance generation technology used on a handwriting device in conjunction with a magnetic roller technology. In the technology, on the premise of not interfering with spatial positions of multiple Hall components, another multipole magnet (called a magnetic damping magnet in this specific embodiment) is added to provide magnetic resistances of different magnitudes through a distance between the magnetic damping magnet and the magnetic roller. The magnetic damping magnet may be fixed or rotating, and the distance from the magnetic roller can be changed. When the magnetic roller is rotating, because of mutual repulsion of the same polarities, there may be a scale sense division by division during rotation of the magnetic roller. When the magnetic damping magnet is close to the magnetic roller, the scale sense is obvious and the roller rotates with greater resistance. When the magnetic damping magnet is gradually away from the magnetic roller, the scale sense may be reduced and the roller rotates more smoothly.

Figure 5:
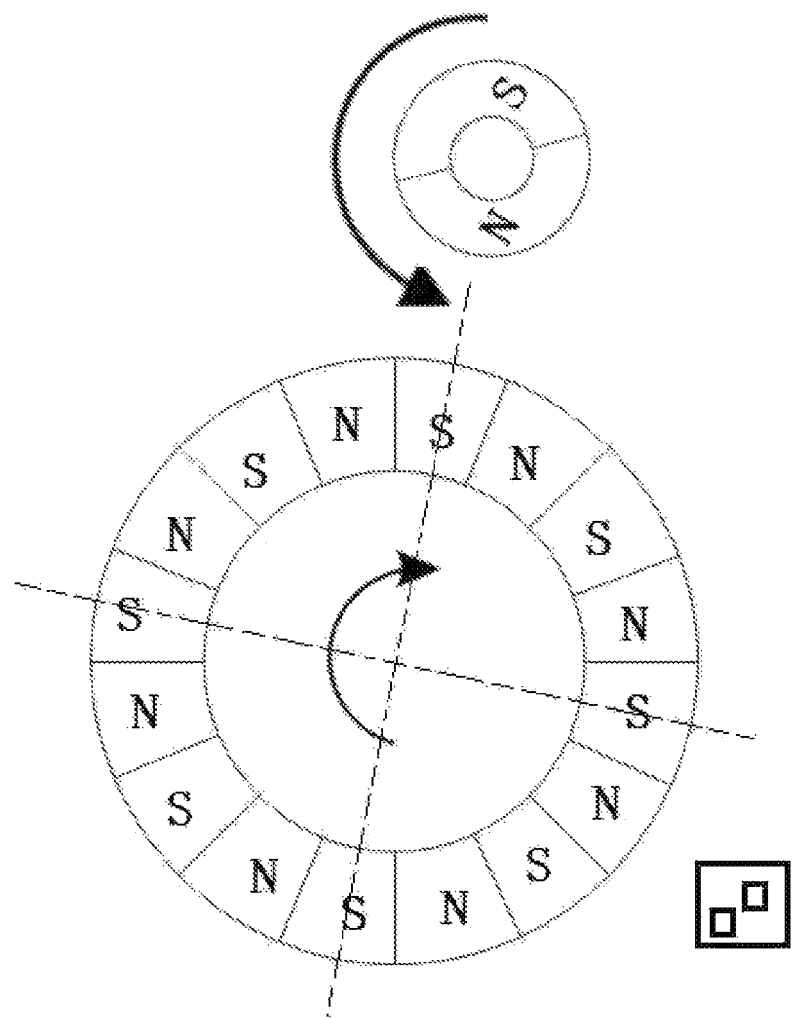
FIG. 5 is a schematic structural diagram when the magnetic damping magnet starts rotating with the rotation of the magnetic roller according to the disclosure.

By taking FIG. 5 as an example, assuming that the total number of magnetic poles of the first multipole magnet is 16 and the total number of magnetic poles of the magnetic damping magnet is 2, when the magnetic damping magnet rotates under an external force, it drives the first multipole magnet to rotate, and the magnetic damping magnet may also rotate together due to an attractive force produced by the magnetic field. When the first multipole magnet rotates by more than 11.25 degrees and reaches the position shown in FIG. 6, the 2-pole magnetic damping magnet may change from an attracted state to a repelled state due to mutual repulsion for the same polarities. Therefore, the first multipole magnet of the magnetic roller may be pushed to the next magnetic pole to reach the position shown in FIG. 7, and at the same time, the 2-pole magnetic damping magnet may also rotate by 90 degrees again to change from the repelled state to the attracted state.

Figure 6:
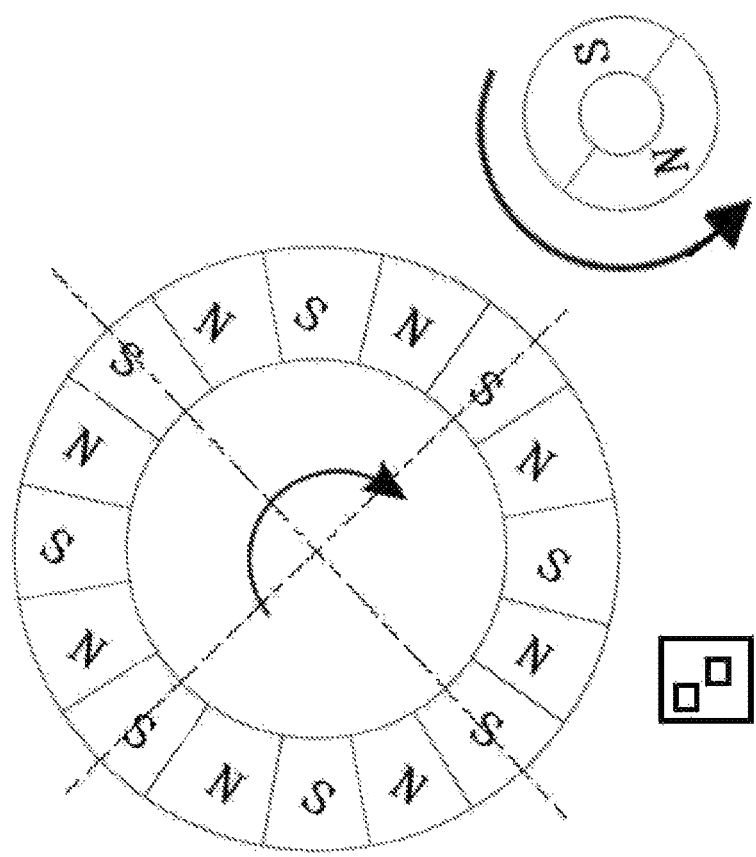
FIG. 6 is a schematic structural diagram when the magnetic damping magnet and a first multipole magnet rotate to positions where they repel each other due to opposite polarities according to the disclosure.
Figure 7:
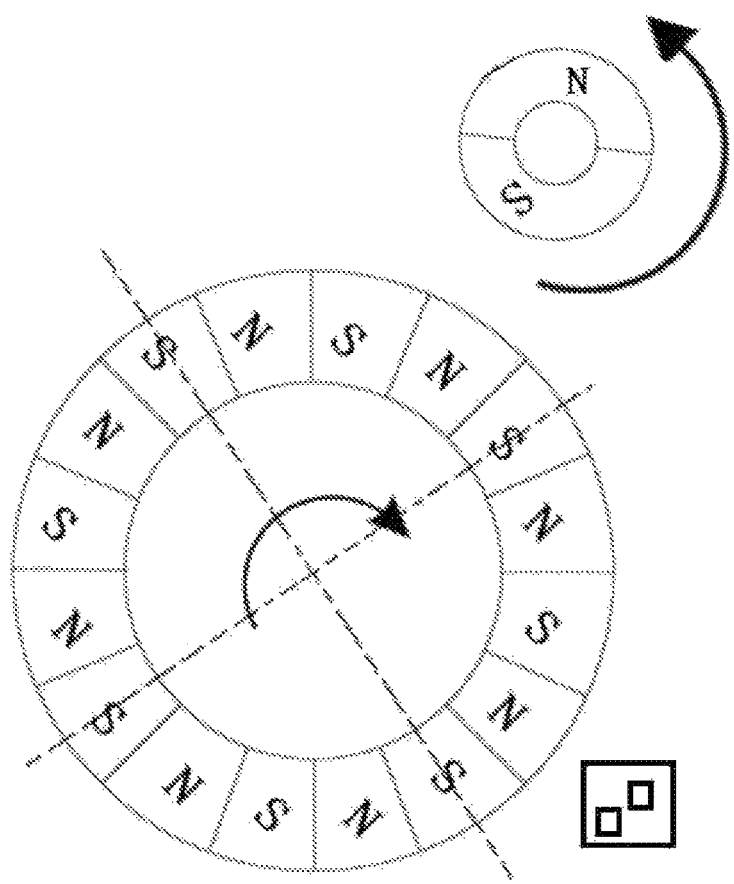
FIG. 7 is a schematic structural diagram when the magnetic damping magnet and the first multipole magnet rotate to positions where they attract each other due to the same polarities according to the disclosure.

That is to say, after the first multipole magnet (i.e., the roller) in FIG. 6 rotates by more than 11.25 degrees, the roller jumps from 11.25 degrees to 22.5 degrees with the help of the physical phenomenon that the same magnets repel each other and opposite magnets attract each other. At this time, the first multipole magnet and the magnetic damping magnet attract each other. If there is no external force, they may no longer rotate. At this time, the magnetic roller gives people a feeling of use just like a mechanical roller, in which after rotation, a mechanical jamming occurs. Each time the magnetic roller rotates, each jamming is just like a division of scale to limit the angle of each rotation. Certainly, a large enough external force may also be applied to make the magnetic roller rotate all the time. However, when the magnetic roller passes through a jamming, a sense of scale may be generated.

As shown in FIG. 3, when the magnetic damping magnet is fixed without rotation, the number of divisions of scale senses corresponding to one rotation of the magnetic roller is obtained by dividing the number of magnetic poles of the first multipole magnet by 2. By taking a 16-pole magnetic roller as an example, when the magnetic damping magnet is fixed without rotation, there may be 8 divisions of scale senses during one rotation of the magnetic roller.

As shown in FIG. 4 to FIG. 7, when the magnetic damping magnet is rotatable, the number of division of scale senses corresponding to one rotation of the magnetic roller is equal to the number of magnetic poles of the first multipole magnet. By taking a 16-pole magnetic roller as an example, when the magnetic damping magnet is in a rotatable state, there may be 16 divisions of scale senses during one rotation of the magnetic roller.

In addition, the magnetic damping magnet may also be replaced with a metal material attractable to the magnet. As shown in FIG. 2, the closer the metal 4 is to the magnetic roller (i.e., the first multipole magnet 1), the larger the resistance of the magnetic roller is. The farther the metal 4 is from the magnetic roller, the smaller the resistance with which the roller rotates is. The shape of the metal 4 is not limited, as long as it can interact with the magnetic roller. However, when such magnetic resistance does not occur, there may be no sense of scale during rotation of the magnetic roller.

When the magnetic damping magnet is away from the magnetic roller at an effective distance where the magnetic damping magnet interacts with the magnetic roller, the magnetic roller may have no scale sense and can rotate smoothly due to the reduced resistance.

Figure 8:
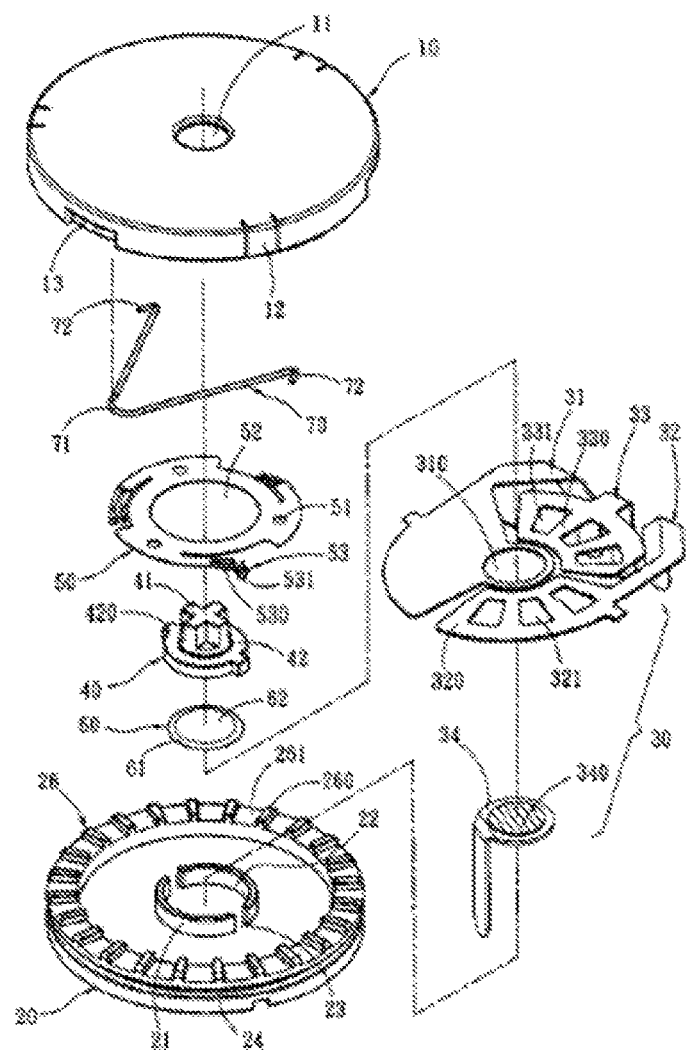
FIG. 8 is an exploded view of an existing mechanical roller.
Figure 9:
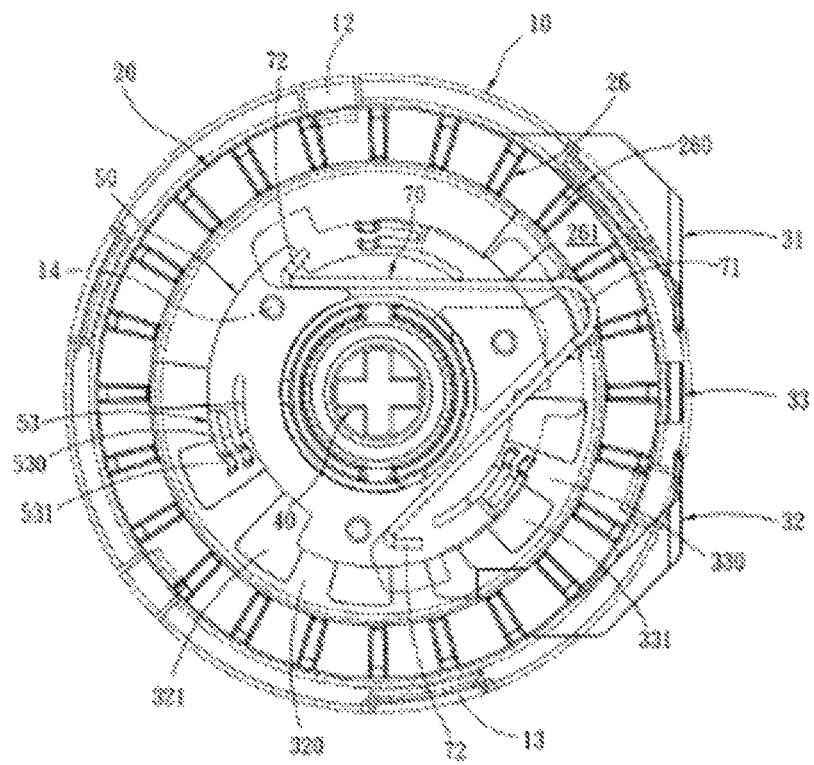
FIG. 9 is a schematic whole structural diagram of the mechanical roller in FIG. 8.

The structure of the conventional mechanical roller is as shown in FIG. 8 and FIG. 9. Generally, a spring 72 is used to push a toothed disc 26. Therefore, during rotation, the spring 72 interacts with the toothed disc 26 to produce a scale sense and noise, but because the toothed disc 26 is made of a plastic material, there may be problem of frictional loss. However, the magnetic damping device in the disclosure can not only provide magnetic resistance, but also provide a sense of scale without noise and frictional loss.

Based on the above, according to the magnetic roller damping device and the implementing method thereof in the disclosure, the magnetic roller damping device composed of a magnetic roller and a magnetic damping mechanism replaces a conventional mechanical roller, and magnetic resistances of different magnitudes can be provided according to the magnetic field force principle just by adjusting a distance between the magnetic roller and the magnetic damping magnet or metal, so that different requirements on roller smoothness are met without using different materials. The magnetic roller damping device is flexible and highly universal. The magnetic field force has no frictional loss, the service life of the roller is prolonged, and there may be no noise. In the disclosure, on the premise of no frictional loss, the smoothness of the magnetic roller can be adjusted through a distance, and the number of divisions of scale senses can be adjusted through the total number of magnetic poles of the first multipole magnet, which is difficult to be achieved through the conventional mechanical roller.

Preferred embodiments of the disclosure are specifically described above, but the disclosure is not limited to the embodiments. Those skilled in the art can further make various equivalent transformations or replacements without departing from the principle of the disclosure. The equivalent transformations or replacements are all encompassed in the scope defined by the claims of this application.

The invention claimed is:

1. A magnetic roller damping device, comprising: a magnetic roller and a magnetic damping mechanism, wherein the magnetic roller comprises a first multipole magnet that comprises at least one pair of magnetic poles with opposite polarities, the magnetic damping mechanism uses a magnetic damping magnet or metal attractable to the first multipole magnet, the magnetic damping magnet or metal is positioned in a magnetic field of the first multipole magnet, a distance between axes of rotation of the magnetic damping magnet or metal and the magnetic roller is greater than a sum of radii of the magnetic damping magnet or metal and the magnetic roller, and a distance between the magnetic damping magnet or metal and the magnetic roller is adjustable, and the magnetic damping magnet is a second multipole magnet that comprises at least one pair of magnetic poles with opposite polarities and the magnetic damping magnet rotates with the rotation of the magnetic roller based on a magnetic field force between the magnetic damping magnet and the magnetic roller.

2. The magnetic roller damping device according to claim 1, wherein when the magnetic damping magnet rotates with the rotation of the magnetic roller, a number of divisions of scale senses corresponding to one rotation of the magnetic roller is equal to the total number of magnetic poles of the first multipole magnet, and one division of scale sense represents a whole process in which a force between the first multipole magnet and the magnetic damping magnet changes from an attractive force to a repulsive force and then from the repulsive force to the attractive force.

3. The magnetic roller damping device according to claim 1, further comprising a microcontroller unit (MCU) and multiple Hall components, wherein the multiple Hall components are positioned in the magnetic field of the first multipole magnet, and output ends of the multiple Hall components are all connected to an input end of the MCU.

4. A method for implementing a magnetic roller damping device, comprising:

acquiring a distance between a magnetic damping mechanism and a magnetic roller in real time, wherein the magnetic roller comprises a first multipole magnet that comprises at least one pair of magnetic poles with opposite polarities, the magnetic damping mechanism uses a magnetic damping magnet or metal attractable to the first multipole magnet, the magnetic damping magnet or metal is positioned in a magnetic field of the first multipole magnet, a distance between axes of rotation of the magnetic damping magnet or metal and the magnetic roller is greater than a sum of radii of the magnetic damping magnet or metal and the magnetic roller, and a distance between the magnetic damping magnet or metal and the magnetic roller is adjustable;

determining a magnitude of a magnetic resistance between the magnetic damping mechanism and the magnetic roller according to the distance acquired in real time;

judging whether the magnetic damping mechanism is a magnetic damping magnet, if yes, proceeding to a next step, and otherwise, ending the method; and acquiring a rotation state of the magnetic damping magnet in real time, the rotation state of the magnetic damping magnet comprising a state of being fixed without rotation and a state of rotating with the rotation of the magnetic roller based on a magnetic field force between the magnetic damping magnet and the magnetic roller.

5. The method for implementing a magnetic roller damping device according to claim 4, further comprising:

calculating a number of divisions of scale senses corresponding to one rotation of the magnetic roller according to the rotation state acquired in real time, one division of scale sense representing a whole process in which a force between the first multipole magnet and the magnetic damping magnet changes from an attractive force to a repulsive force and then from the repulsive force to the attractive force.

6. The method for implementing a magnetic roller damping device according to claim 5, wherein the calculating the number of divisions of scale senses corresponding to one rotation of the magnetic roller according to the rotation state acquired in real time comprising:

if the rotation state acquired in real time is the state of being fixed without rotation, calculating the number of divisions of scale senses corresponding to one rotation of the magnetic roller according to the total number of magnetic poles of the first multipole magnet, the number of divisions of scale senses corresponding to one rotation of the magnetic roller being equal to the total number of magnetic poles of the first multipole magnet divided by 2; and if the rotation state acquired in real time is the state of rotating with the rotation of the magnetic roller, calculating the number of divisions of scale senses corresponding to one rotation of the magnetic roller according to the total number of magnetic poles of the first multipole magnet, the number of divisions of scale senses corresponding to one rotation of the magnetic roller being equal to the total number of magnetic poles of the first multipole magnet.

7. The method for implementing a magnetic roller damping device according to claim 4, further comprising: acquiring rotation information of the magnetic roller through multiple Hall components and a microcontroller unit (MCU).

* * * * *